(12) United States Patent
Baum et al.

(10) Patent No.: US 9,805,234 B1
(45) Date of Patent: Oct. 31, 2017

(54) ARRANGEMENT FOR DETERMINING THE PLUGGING POSITION OF A HOSE COUPLING ON A CONNECTION FIELD

(71) Applicant: DEERE & COMPANY, Moline, IL (US)

(72) Inventors: Bernd Baum, Dannstadt-Schauernheim (DE); Florian Reinmuth, Sinsheim (DE); Daniel Frost, Ludwigshafen (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/458,602

(22) Filed: Mar. 14, 2017

(30) Foreign Application Priority Data

Apr. 15, 2016  (DE) .......................... 10 2016 206 401

(51) Int. Cl.
| | |
|---|---|
| *G06K 7/10* | (2006.01) |
| *F16L 37/56* | (2006.01) |
| *A01B 76/00* | (2006.01) |
| *G08C 17/02* | (2006.01) |

(52) U.S. Cl.
CPC .......... *G06K 7/10465* (2013.01); *A01B 76/00* (2013.01); *F16L 37/56* (2013.01); *G06K 7/10217* (2013.01); *G08C 17/02* (2013.01); *F16L 2201/60* (2013.01)

(58) Field of Classification Search
CPC .......... G06K 19/0723; G06K 7/10366; G06K 7/0008; G06K 19/07749; G06K 7/10297; G06K 2017/0051; G06K 7/10158

USPC ...................................................... 340/10.42
See application file for complete search history.

(56) References Cited

U.S. PATENT DOCUMENTS

| | | | |
|---|---|---|---|
| 7,482,928 B2 * | 1/2009 | Brackmann | ............... B60P 3/03 180/290 |
| 9,574,952 B2 * | 2/2017 | Schintee | ............... G01L 9/0001 |
| 2010/0174495 A1 * | 7/2010 | Pereira | .................. F16L 11/127 702/34 |

\* cited by examiner

*Primary Examiner* — Mark Blouin

(57) ABSTRACT

An arrangement for determining a plugging position of a hose coupling on a connection field includes the connection field including a plurality of coupling sockets and a plurality of hose couplings in which each of the plurality of hose couplings is coupled to a corresponding one of the plurality of coupling sockets. The at least one hose coupling includes a receiving coil and each of the plurality of coupling sockets includes a transmitting coil. A data interface is disposed in communication with the receiving coil, and an evaluation unit is disposed in communication with the data interface. The receiving coil is configured to analyze an individual identifier retrievable at the transmitting coil during connection of the at least one hose coupling to one of the coupling sockets, and the identifier is transmitted via the data interface to the evaluation unit to determine the plugging position of the hose coupling.

16 Claims, 3 Drawing Sheets

ARRANGEMENT FOR DETERMINING THE PLUGGING POSITION OF A HOSE COUPLING ON A CONNECTION FIELD

RELATED APPLICATIONS

This application claims the benefit of German Application Ser. No. 102016206401.0, filed on Apr. 15, 2016, the disclosure of which is hereby expressly incorporated by reference in its entirety.

FIELD OF THE DISCLOSURE

The present disclosure relates to a hose coupling, and in particular to an arrangement for determining the plugging position of a hose coupling on a connection field.

BACKGROUND

A conventional arrangement of an agricultural machine that can be attached to a tractor is known in the art. The arrangement includes a plurality of hydraulic hoses via which hydraulic working functions of the agricultural machine can be controlled. An individual radio-frequency identification ("RFID") transponder is mounted on each of the hydraulic hoses. The RFID transponders are located in the vicinity of associated connecting ends of the hydraulic hoses, so that RFID readers mounted on tractor-side mating connectors can read out the respective RFID transponder when the connecting ends are being plugged in. This makes it possible to produce an association of the hydraulic lines, or of working functions that can be controlled thereby, with the respective mating connectors. In turn, this allows an associated control electronics unit to assign functions correspondingly to the mating connectors. Since this simultaneously requires transmission of an individual coupling identifier, data transmission between the RFID transponder and the RFID reader is comparatively complicated.

This disclosure provides an arrangement of the type mentioned above that is improved with respect to data transmission therein.

SUMMARY

In one embodiment of the present disclosure, an arrangement or system includes a connection field having a plurality of coupling sockets for connecting associated hose couplings, at least one hose coupling connectable thereto, a data interface and an evaluation unit. In addition, the at least one hose coupling has a receiving coil and each of the coupling sockets has a transmitting coil, wherein an individual identifier retrievable at the transmitting coil is read by means of the receiving coil during connection of the at least one hose coupling to one of the coupling sockets, and is transmitted via the data interface communicating with the receiving coil to the evaluation unit for determining the plugging position of the at least one hose coupling.

The transmitted identification data can be the identifier itself or a parameter derived therefrom that characterizes the identifier in unambiguous manner. Since the identifier is transmitted from the connecting socket in the direction of the at least one hose coupling, the simultaneous transmission of an individual coupling identifier, as is required in the arrangement known from the prior art, is not necessary. This leads to a substantial simplification of the data transmission between transmitting and receiving coils.

An individual identifier, distinguished in an unambiguous manner from those of the other coupling sockets of the connection field, is assigned to each of the coupling sockets so that a reliable recognition of the respective plugging position of the at least one hose coupling on the connection field is ensured.

The hose couplings are typically hydraulic or pneumatic energy supply connectors as are generally used in the utility vehicle field. The coupling sockets are accordingly designed as hydraulic or pneumatic sockets for receiving the hose couplings.

The identifier may be a current signal that is induced in the receiving coil by means of the transmitting coil and has a frequency or amplitude specific to the respective coupling socket. Each of the transmitting coils can be connected to a generator unit of its own for producing a corresponding current signal. Differing from this, however, it is also conceivable that a single frequency mixture in the form of a noise signal generated by a single synthesizer is applied to all transmitting coils, wherein the coil-specific current signals are generated by means of resonant circuits formed with the transmitting coils and additional filter elements. Apart from the use of analog current signals, these can also be digital current signals for providing a binary code representing the identifier.

According to one embodiment of the present disclosure, there is the possibility that the evaluation unit of the coupling socket can assign a function associated with the at least one hose coupling depending on the determined plugging position.

Such a self-configuration is particularly advantageous for an agricultural vehicle combination consisting of a tractor and an implement, since each of the hose couplings of the implement is assigned to a defined hydraulically executable working function, which is performed by hydraulic driving or actuating devices on the implement.

The connection field can be designed as an electrically actuatable control valve block that is located in the rear or front area of the tractor in the vicinity of an associated mechanical implement interface. Each of the hose couplings is usually assigned to a defined plugging position on the control valve block. Confusions therefore automatically lead to a malfunction of the implement. The self-configuration of the connection field, and therefore of the control valve block, consequently allows the operator to connect the hose coupling to any of the coupling sockets regardless of the respective associated working function of the hose coupling.

According to a second embodiment of the arrangement or system of the present disclosure, an operator feedback for verifying the correct plugging position of the at least one hose coupling on the connection field can be provided. This is particularly advantageous if self-configuration of the connection field is not possible for technical reasons. In such a case, the evaluation unit checks whether the transmitted identification data, i.e. the determined plugging position of the at least one hose coupling on the connection field, is correlated with the function associated with the at least one hose coupling.

If this is the case, the evaluation unit initiates user feedback in the form of issuing appropriate user information by activating an associated indicator unit, e.g., a green LED. If there is no correlation, however, the output of user information is appropriately adapted, for example, by activating a red LED by the indicator unit. In this manner, the operator detects whether the hose coupling is in its correct plugging position or must be reconnected. Alternatively, it is also conceivable that the operator feedback precedes the establishment of the final coupling connection, in that when the at least one hose coupling approaches one of the coupling sockets, the operator already receives a visual indication as to whether this coupling socket is compatible with the correct plugging position. As a result, annoying or inconvenient reconnecting of the hoses to the connection field, constructed in particular as an electrically operable control valve block, can thereby be avoided.

Despite the above-described (visual) operator feedback, the successful verification of the correct plugging position can also be used to activate the operation of the connection field, and otherwise to block it, so that malfunctions of a connected implement can be avoided.

The identification data is transmitted, in particular wirelessly, by means of a transponder by the data interface. The transponder can be structurally integrated into the at least one hose coupling and can operate with the Bluetooth standard according to IEEE 802.15.1. The identifier read by a transponder via the receiving coil is transmitted wirelessly in the form of the associated identification data to a receiving or transmitting unit connected to the evaluation unit. Alternatively, use of any other wireless transmission links is also conceivable.

In an agricultural vehicle combination consisting of a tractor and an implement, the receiving or transmitting unit, including the evaluation unit, can be associated with the tractor or the implement. In the latter case, the evaluation unit is designed as a so-called job computer that manages, via an ISO bus network connected to a control unit of the tractor, coordination tasks for working functions that can be executed by the implement, and possibly other things. In order to be able to assign the identification data transmitted by the transponder to a defined hose coupling, the identification data is further provided with a corresponding transponder identifier.

The transponder can be supplied with energy in a non-contact manner, more precisely by means of the transmitting coil, by inducing an alternating field in the receiving coil. In this case it is possible to forgo a separate power supply for the transponder such as a battery or a chargeable energy storage means. On the other hand, it is also conceivable that, during connection of the at least one hose coupling, a spring-loaded wiper provided on the coupling socket and connected to a power supply establishes electrical contact with a contact ring that runs on the periphery of the at least one hose coupling and is connected to the transponder.

If the identification data is transmitted wirelessly, the indicator unit can be structurally integrated into the transponder and thus protected from damage and external contamination. In this case, the transponder receives the signals necessary for controlling the display unit from the evaluation unit, more precisely, wirelessly via the receiving or transmitting unit connected to the evaluation unit.

The readout process of the identifier can be initiated upon approach of the receiving coil to the transmitting coil, more particularly upon receiving the power supply of the transponder connected thereto. In addition, the initiation of the readout process for agricultural vehicle combination can be made dependent on the detection of an ISO bus data communications connection established between the tractor and the implement.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
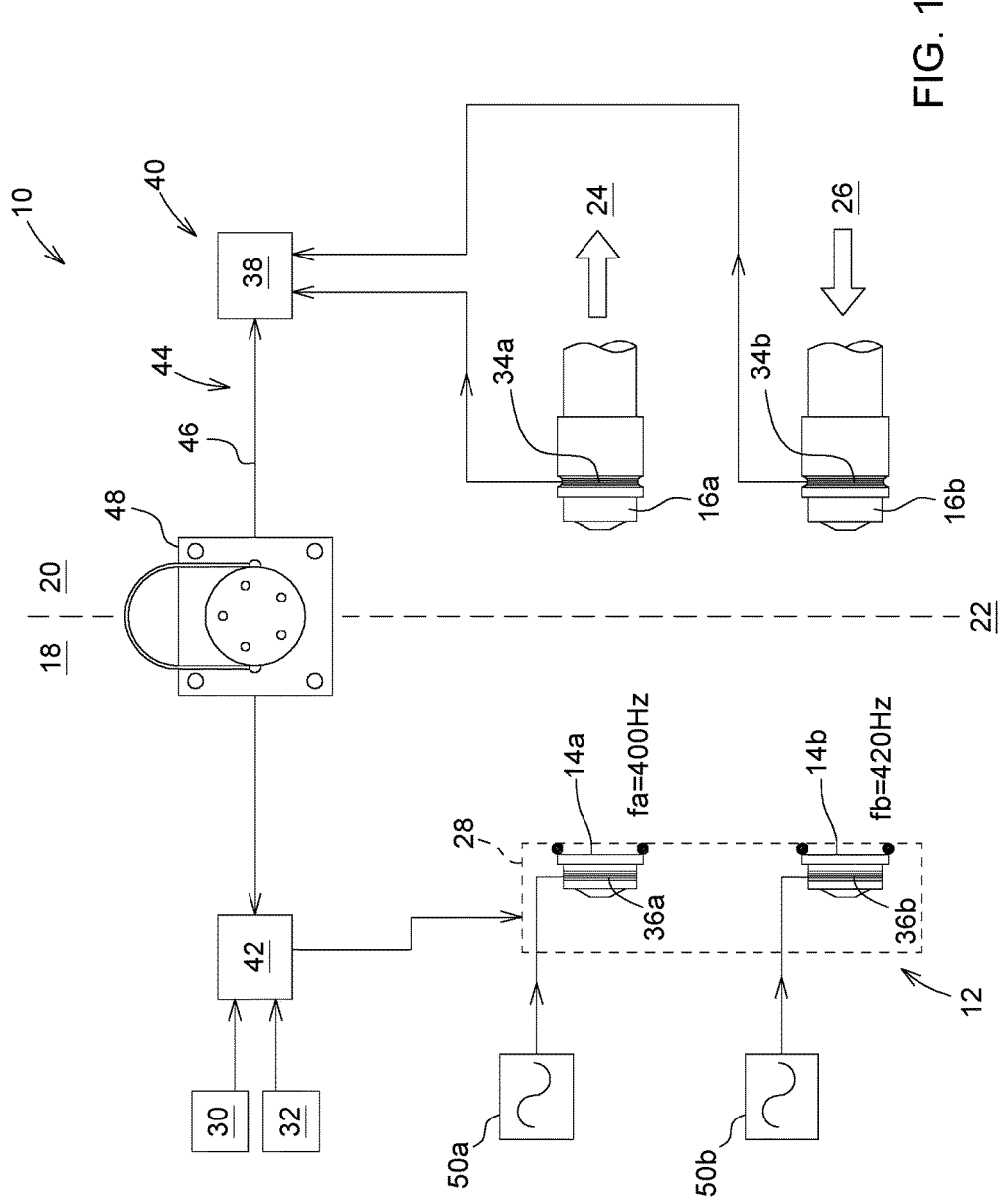
FIG. 1 is a schematic of a first embodiment of an arrangement for determining a plugging position of a hose coupling on a connection field.

In FIG. 1, a first embodiment is shown of an arrangement of the present disclosure for determining the plugging position of a hose coupling on a connection field.

The arrangement 10 includes a connection field 12 that has a plurality of coupling sockets 14a, 14b for connecting associated hose couplings 16a, 16b. The hose couplings 16a, 16b are likewise part of the arrangement 10, and in the present embodiment are hydraulic energy supply connectors. The coupling sockets 14a, 14b are accordingly designed as hydraulic sockets for receiving hose couplings 16a, 16b. According to an improvement of the arrangement 10, not shown, additional hose couplings in the form of pneumatic energy supply connectors can also be present, in which case the coupling sockets are pneumatic sockets.

The arrangement 10 is a component of a vehicle combination 22 consisting of a tractor 18 and an implement 20. Each of the hose couplings 16a, 16b of the implement 20 is assigned a defined hydraulically executable working function 24, 26, which is performed by means of hydraulic driving or control devices (not shown) on the implement 20.

The connection field 12 is designed as an electrically actuatable control valve block 28 that is located in the rear or front area of the tractor 18 in the vicinity of an associated mechanical implement interface (not shown). The mechanical implement interface is a three point power lift, a coupling jaw, a drawbar or the like.

The control valve block 28 has proportional valves (not shown) individually assigned to the coupling sockets 14a, 14b, which can be actuated independently of one another via a user interface 30 in the form of a touch sensitive operating and display unit or by an assistance system 32 such as a headland management system or the like to perform the respective working functions 24, 26 of the implement 20.

For purposes of illustrating the mode of operation of the arrangement 10, only two coupling sockets 14a, 14b are represented, but alternatively additional ones may also be provided. In typical tractor applications, there can be up to twelve hydraulic sockets which are arranged in pairs in order to form a respective outflow and return flow for hydraulic fluid.

In addition, each of the hose couplings 16a, 16b has a receiving coil 34a, 34b and each of the coupling sockets 14a, 14b has a transmitting coil 36a, 36b. The receiving coils 34a, 34b and the transmitting coils 36a, 36b are structurally embedded in the hose couplings 16a, 16b and coupling sockets 14a, 14b respectively, in order to protect the coils from external damage.

During connection of the hose coupling 16a, 16b to one of the coupling sockets 14a, 14b, an individual identifier that can be retrieved at the transmitting coil 36a, 36b is read out by means of the receiving coil 34a, 34b and transmitted via a data interface 38, which communicates with the receiving coil 34a, 34b and is part of a job computer 40, in the form of associated identification data to an evaluation unit 42 provided on the tractor for determining the plugging position of the hose coupling 16a, 16b. The transmitted identification data can be the identifier itself or a parameter derived therefrom that characterizes the identifier unambiguously. An individual identifier, distinguished unambiguously from those of the other coupling sockets of the connection field 12, is assigned to each of the coupling sockets 14a, 14b, so that a reliable recognition of the respective plugging position of the hose coupling 16a, 16b on the connection field 12 is ensured.

In the present embodiment, the identifiers read out by the receiving coils 34a, 34b are processed and digitized for providing the identification data by the data interface 38 or the job computer 40. The identification data yielded in this manner is then transmitted to the evaluation unit 42 via a data bus 44, more precisely an ISO bus network 46 and an ISO bus plug connector (ISO bus breakaway connector) 48 arranged between the tractor 18 and the implement 20.

The identifier is a current signal induced in the receiving coil 34a, 34b by means of the transmitting coil 36a, 36b and having a frequency or amplitude specific to the coupling sockets 14a, 14b. According to the present example, a frequency $f_a$ of 400 Hz is provided for the upper coupling socket 14a and a frequency $f_b$ of approximately 420 Hz is provided for the lower coupling socket 14b, with substantially corresponding amplitude. Each of the transmitting coils 36a, 36b is connected to a signal synthesizer 50a, 50b of its own for generating a corresponding current signal. Alternatively, however, it is also conceivable to apply a uniform frequency mixture in the form of a noise signal generated by a signal synthesizer to all transmitting coils 36a, 36b, wherein the coil-specific current signals are generated by means of resonant circuits formed with the transmitting coils 36a, 36b and additional filter elements.

According to the present example, the evaluation unit 42 assigns, depending on the determined plugging position, a working function associated with the hose coupling 16a, 16b, i.e., the working function 24, 26 of the implement 20 that is associated with the respective hose coupling 16a, 16b, to each coupling socket 14a, 14b. The self-configuration of the connection field 12 performed in this manner makes it possible for the operator to connect the hose couplings 16a, 16b to any of the coupling sockets 14a, 14b regardless of their associated working functions 24, 26.

An alternative embodiment of the arrangement 10 provides an implement-side controller for various tractor functions, including the control valve block 28 associated with the tractor 18. The control commands necessary for this are transmitted by the job computer 40 of the implement 20 via the ISO bus network 46 to an associated tractor controller, i.e., the evaluation unit 42 in this case. Such a function is known under the name "tractor-implement automation" (TIA) for tractors from the manufacturer John Deere. In this case, there is no transmission of the identification data, but rather the data is used by the job computer 40 for implement-side determination of the plugging position of the hose couplings 16a, 16b in order to modify the control commands relating to the control valve block 28 such that a correct performance of the associated hydraulic working functions 24, 26 is provided.

Figure 2:
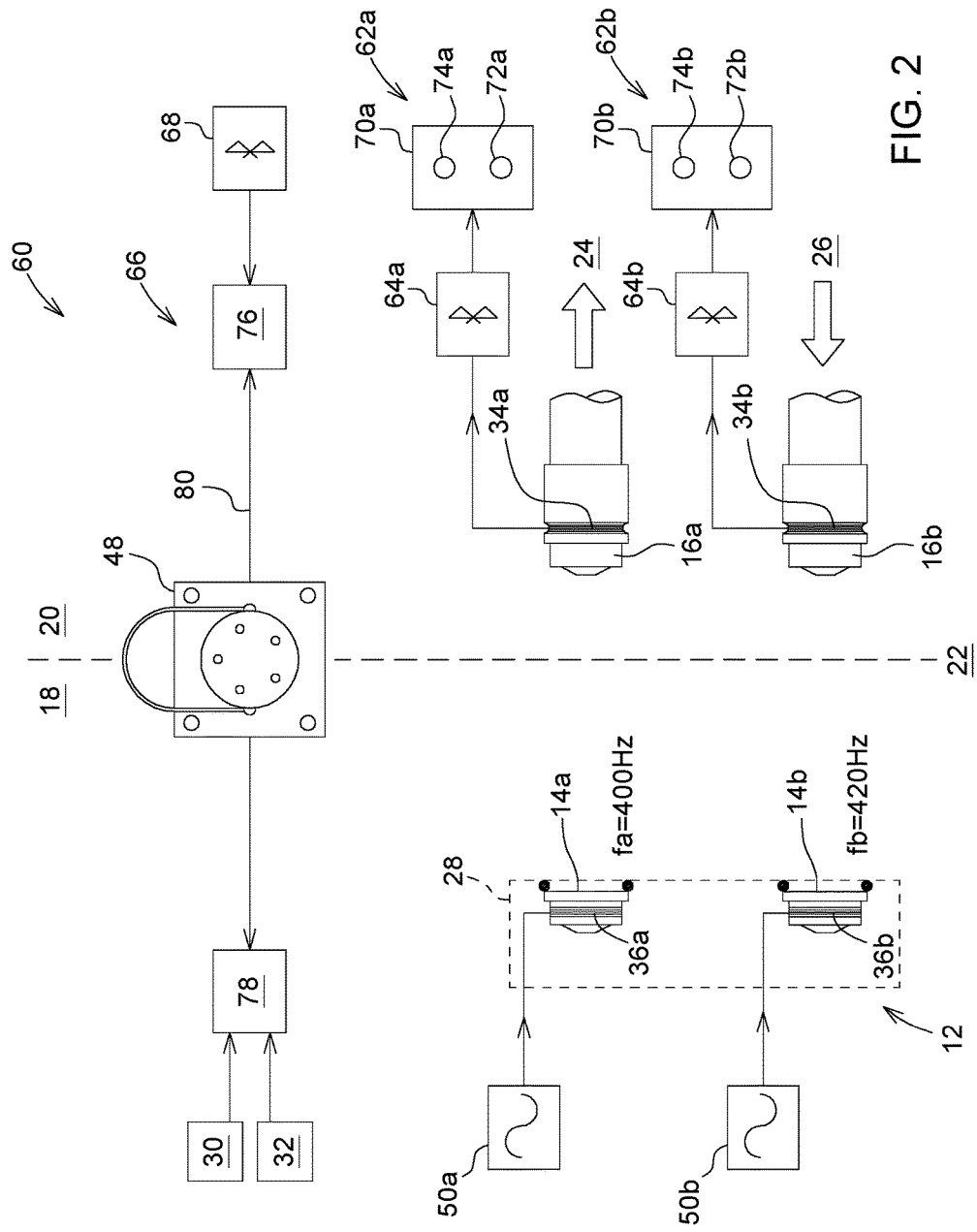
FIG. 2 is a schematic of a second embodiment of an arrangement for determining the plugging position of a hose coupling on a connection field.

In FIG. 2, a second embodiment of an arrangement of the present disclosure is shown for determining the plugging position of a hose coupling on a connection field.

The arrangement 60 differs from the first embodiment, among other things, in that operator feedback for verifying the correct plugging position of the hose couplings 16a, 16b on the connection field 12 is provided rather than a self-configuration of the connection field 12. This is particularly advantageous if a self-configuration of the connection field 12 is not possible for technical reasons such as the retrofitting of (older) tractors from an existing vehicle inventory.

In addition, the arrangement 60 provides wireless transmission of the identification data by means of a transponder 64a, 64b included by a respective data interface 62a, 62b. The transponder 64a, 64b is structurally integrated (contrary to the schematic representation in FIG. 2) into the respective hose coupling 16a, 16b and operates with the Bluetooth standard according to IEEE 802.15.1. The identifier read by a transponder 64a, 64b via the receiving coil 34a, 34b is transmitted wirelessly in the form of associated identification data to a receiving or reading unit 68 connected to the evaluation unit 66.

The evaluation unit 66 checks whether the transmitted identification data, i.e., the determined plugging position of the hose couplings 16a, 16b on the connection field 12 correlates with the function associated with the respective hose coupling 16a, 16b. If this is the case, the evaluation unit 66 initiates user feedback in the form of issuing appropriate user information by activating an associated indicator unit 70a, 70b, e.g., a green LED 72a, 72b in the present case. If there is no correlation, however, the output of user information is appropriately adapted, which is done by activating a red LED 74a, 74b comprised by the indicator unit 70a, 70b. In this manner, the operator detects whether the hose coupling 16a, 16b is in its correct plugging position or must be reconnected. Alternatively, it is also conceivable that the operator feedback precedes the establishment of the final coupling connection in that when the at least one hose coupling 14a, 14b approaches one of the coupling sockets 16a, 16b, the operator receives a visual indication as to whether this coupling socket is compatible with the correct plugging position. In this manner, annoying or inconvenient reconnecting of the hose couplings 16a, 16b can be avoided.

The indicator unit 70a, 70b is integrated structurally with the transponder 64a, 64b into the data interface 62a, 62b and is thus protected from external contamination. The transponder 64a, 64b receives the signals necessary for controlling the indicator unit 70a, 70b from the evaluation unit 66, more precisely, wirelessly via the receiving or transmitting unit 68 connected to the evaluation unit 66.

Despite the above described visual operator feedback, the successful verification of the correct plugging position can also be used to activate the operation of the connection field 12, and otherwise to block it, so that malfunctions of a connected implement 20 can be avoided.

The evaluation unit 66 is associated with the implement 20 as a so-called job computer 76. Via an ISO bus network 80 connected to a control unit 78 of the tractor 18, the job computer 76 manages, among other things, the coordination tasks for working functions that can be executed by the implement 20. In order to be able to assign the identification data transmitted by the transponder 64a, 64b to a defined hose coupling, the identification data is further provided with a corresponding transponder identifier.

Figure 3:
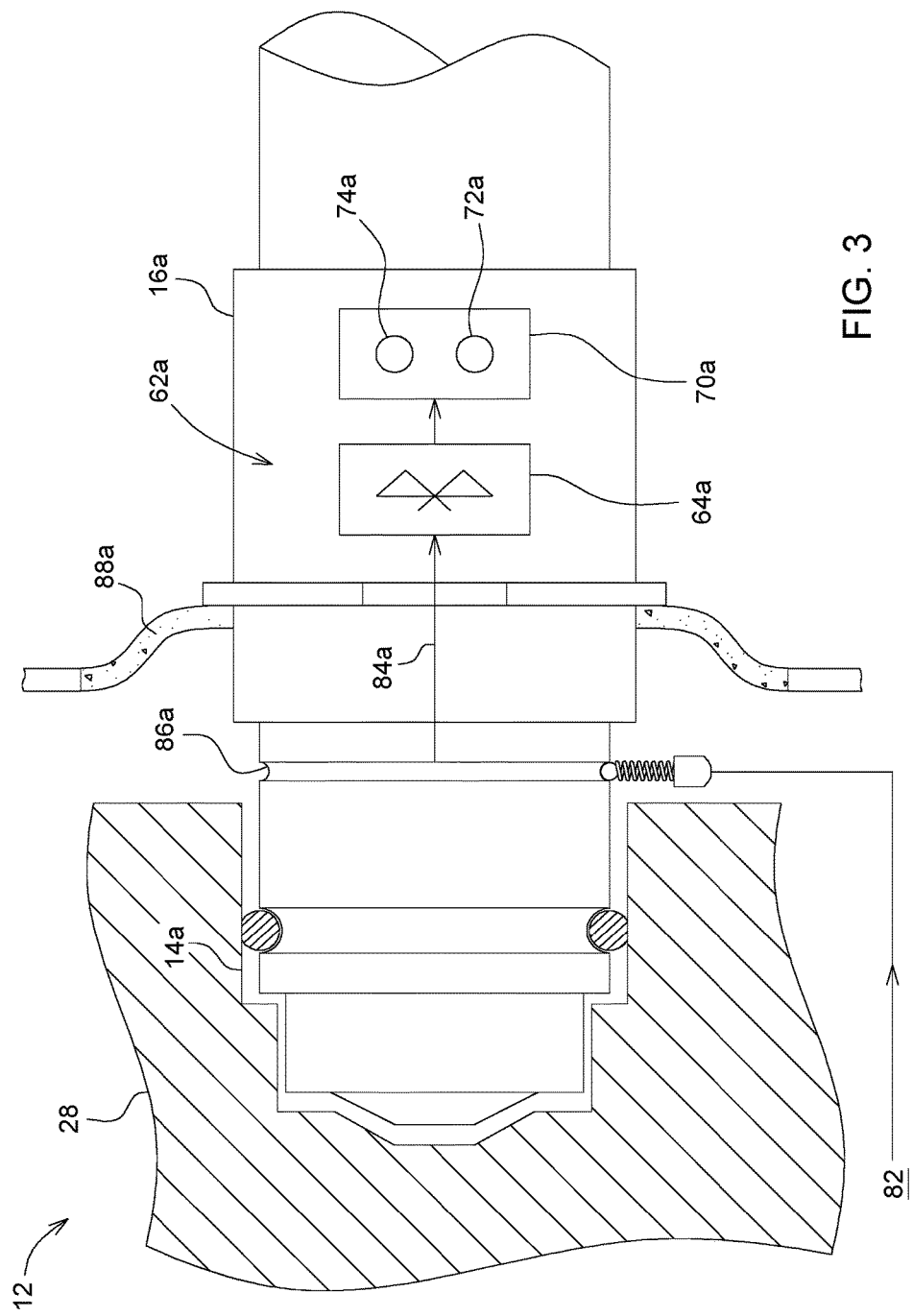
FIG. 3 is a sectional view of a connection field having a coupling socket and a host coupling connected thereto of the arrangement in FIG. 2.

The energy is supplied to the transponder 64a, 64b without contact, by means of the transmitting coil 36a, 36b by inducing an alternating field in the receiving coil 34a, 34b. This type of energy supply, however, is only one of multiple possibilities. Thus, according to an alternative improvement of the arrangement 60 as shown in FIG. 3, a spring-loaded wiper 84a that is provided on the upper coupling socket 14a of the connection field 12 and connected to a power supply 82 can, during connection of the hose coupling 16a, establish electrical contact with a contact ring 86a running circumferentially on the hose coupling 16a and connected to the transponder 64a. A dust protection ring 88a prevents penetration of moisture and external contamination. The receiving and transmitting coils 36a, 36b are omitted for reasons of clarity. The above considerations apply accordingly to the lower coupling socket 14b.

The process of reading out the identifier is initiated by the evaluation unit 66 or the transponder 64a, 64b upon approach of the receiving coil 34a, 34b to the transmitting coil 36a, 36b, more precisely upon receipt of an associated noncontact energy supply of the transponder 64a, 64b. The initiation of the readout process is optionally made dependent upon detection of an ISO bus data communication link between the tractor 18 and the implement 20 via the ISO bus network 80.

According to the present example, the evaluation unit 66 and the receiving or reading unit 68 are associated with the implement 20. According to an alternative design of the arrangement 60, the evaluation unit 66, including the receiving or reading unit 68, is part of the tractor 18 or of a control device architecture. Here, the evaluation unit and its components are linked via a CAN data bus to the control unit 78.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An arrangement for determining a plugging position of a hose coupling on a connection field, comprising:
    the connection field including a plurality of coupling sockets;
    a plurality of hose couplings in which each of the plurality of hose couplings is coupled to a corresponding one of the plurality of coupling sockets, where at least one hose coupling comprises a receiving coil and each of the plurality of coupling sockets comprises a transmitting coil;
    a data interface disposed in communication with the receiving coil; and
    an evaluation unit disposed in communication with the data interface;
    wherein, the receiving coil is configured to analyze an individual identifier retrievable at the transmitting coil during connection of the at least one hose coupling to one of the coupling sockets, and the identifier is transmitted via the data interface to the evaluation unit to determine the plugging position of the at least one hose coupling.

2. The arrangement of claim 1, wherein the identifier comprises a current signal induced in the receiving coil by the transmitting coil and includes a frequency or amplitude corresponding to the plurality of coupling sockets.

3. The arrangement of claim 1, wherein the evaluation unit is operably configured to assign a function associated with the at least one hose coupling to the coupling socket based on the determined plugging position.

4. The arrangement of claim 1, wherein the connection field comprises an electrically actuatable control valve block.

5. The arrangement of claim 1, wherein operator feedback is provided for verifying the correct plugging position of the at least one hose coupling on the connection field.

6. The arrangement of claim 1, wherein the identification data is transmitted wirelessly by means of a transponder of the data interface.

7. The arrangement of claim 6, wherein the energy for the transponder is supplied without contact.

8. The arrangement of claim 1, wherein the analysis of the identifier is initiated upon approach of the receiving coil to the transmitting coil.

9. An agricultural vehicular system, comprising:
    a tractor;
    an implement coupled to the tractor, the implement including an arrangement comprising:
        a connection field including a plurality of coupling sockets;
        a plurality of hose couplings in which each of the plurality of hose couplings is coupled to a corresponding one of the plurality of coupling sockets, where at least one hose coupling comprises a receiving coil and each of the plurality of coupling sockets comprises a transmitting coil;
        a data interface disposed in communication with the receiving coil; and
        an evaluation unit disposed in communication with the data interface;
        wherein, the receiving coil is configured to analyze an individual identifier retrievable at the transmitting coil during connection of the at least one hose coupling to one of the coupling sockets, and the identifier is transmitted via the data interface to the evaluation unit to determine the plugging position of the at least one hose coupling.

10. The agricultural vehicular system of claim 9, wherein the identifier comprises a current signal induced in the receiving coil by the transmitting coil and includes a frequency or amplitude corresponding to the plurality of coupling sockets.

11. The agricultural vehicular system of claim 9, wherein the evaluation unit is operably configured to assign a function associated with the at least one hose coupling to the coupling socket based on the determined plugging position.

12. The agricultural vehicular system of claim 9, wherein the connection field comprises an electrically actuatable control valve block.

13. The agricultural vehicular system of claim 9, wherein operator feedback is provided for verifying the correct plugging position of the at least one hose coupling on the connection field.

14. The agricultural vehicular system of claim 9, wherein the identification data is transmitted wirelessly by means of a transponder of the data interface.

15. The agricultural vehicular system of claim 14, wherein the energy for the transponder is supplied without contact.

16. The agricultural vehicular system of claim 9, wherein the analysis of the identifier is initiated upon approach of the receiving coil to the transmitting coil.

* * * * *